US010673965B2

(12) United States Patent
Obukhov et al.

(10) Patent No.: US 10,673,965 B2
(45) Date of Patent: Jun. 2, 2020

(54) ADJUSTING HEAVY USERS' AFFINITY FOR HEAVY USER ENTITY-PAIRS IN A SOCIAL NETWORK

(71) Applicant: Microsoft Technology Licensing, LLC, Redmond, WA (US)

(72) Inventors: Mikhail Obukhov, Mountain View, CA (US); Qi He, San Jose, CA (US); Bee-Chung Chen, San Jose, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 712 days.

(21) Appl. No.: 14/839,531

(22) Filed: Aug. 28, 2015

(65) Prior Publication Data

US 2017/0064020 A1 Mar. 2, 2017

(51) Int. Cl.
*H04L 29/08* (2006.01)
*H04L 12/58* (2006.01)
*G06Q 50/00* (2012.01)

(52) U.S. Cl.
CPC ............ *H04L 67/22* (2013.01); *G06Q 50/01* (2013.01); *H04L 51/32* (2013.01); *H04L 67/306* (2013.01); *H04L 67/20* (2013.01)

(58) Field of Classification Search
CPC ....... H04L 67/22; H04L 51/32; H04L 67/306; H04L 67/20; G06Q 50/01
See application file for complete search history.

(56) References Cited

U.S. PATENT DOCUMENTS 8,171,128 B2 * 5/2012 Zuckerberg ............ G06Q 30/02
709/224
8,548,996 B2 * 10/2013 Tareen .............. G06F 16/24578
707/732

(Continued)

FOREIGN PATENT DOCUMENTS

| WO | WO-2013024338 A1 | 2/2013 |
| WO | WO-2016122726 A1 | 8/2016 |

OTHER PUBLICATIONS

U.S. Appl. No. 14/788,260, filed Jun. 30, 2015, Content Provision Based on User-Pair Affinity in a Social Network.

(Continued)

*Primary Examiner* — Kevin T Bates
*Assistant Examiner* — Ronak Patel
(74) *Attorney, Agent, or Firm* — Schwegman Lundberg & Woessner, P.A.

(57) ABSTRACT

A system and method of adjusting an affinity score between an entity pair in a social network is disclosed. The method may include determining, with a processor, whether a first member of the entity pair is a heavy user member. The method further includes if the first member is the heavy user member, determining, with the processor, an affinity adjustment factor between the first member and the second member, and adjusting, with the processor, the affinity score between the first member and the second member of the entity pair in accordance with the adjustment factor to determine an adjusted affinity score. The method may include determining, with the processor, whether a number of interactions on content items indicates that the first member is the heavy user member. The second member is associated with a content item that is being considered for display to the first member.

20 Claims, 7 Drawing Sheets

(56) References Cited

U.S. PATENT DOCUMENTS

| | | | |
|---|---|---|---|
| 8,688,701 B2* | 4/2014 | Ghosh | G06Q 30/02 |
| | | | 707/736 |
| 8,793,255 B1* | 7/2014 | Bilinski | G06Q 10/06393 |
| | | | 707/740 |
| 8,938,500 B1* | 1/2015 | Acharya | G06Q 50/01 |
| | | | 709/204 |
| 9,098,176 B1 | 8/2015 | Tauber et al. | |
| 9,703,837 B1* | 7/2017 | Teng | G06Q 30/0202 |
| 2006/0042483 A1 | 3/2006 | Work et al. | |
| 2008/0040474 A1 | 2/2008 | Zuckerberg et al. | |
| 2012/0324004 A1 | 12/2012 | Le et al. | |
| 2013/0018896 A1 | 1/2013 | Fleischman et al. | |
| 2013/0318180 A1* | 11/2013 | Amin | G06Q 30/0251 |
| | | | 709/206 |
| 2014/0052540 A1 | 2/2014 | Rajaram et al. | |
| 2014/0059139 A1* | 2/2014 | Filev | G06Q 50/01 |
| | | | 709/205 |
| 2014/0067826 A1* | 3/2014 | Jackson | G06Q 50/01 |
| | | | 707/748 |
| 2014/0067967 A1* | 3/2014 | Jackson | G06Q 50/01 |
| | | | 709/206 |
| 2014/0074934 A1* | 3/2014 | van Hoff | H04L 65/40 |
| | | | 709/204 |
| 2014/0317732 A1* | 10/2014 | Beaufrere | H04L 63/1441 |
| | | | 726/22 |
| 2015/0046528 A1* | 2/2015 | Piepgrass | G06F 15/17306 |
| | | | 709/204 |
| 2015/0066789 A1 | 3/2015 | Keith | |
| 2015/0081449 A1* | 3/2015 | Ge | G06Q 30/0269 |
| | | | 705/14.66 |
| 2015/0100683 A1 | 4/2015 | Chung et al. | |
| 2015/0375104 A1 | 12/2015 | Nishar et al. | |
| 2016/0055159 A1* | 2/2016 | Connolly | G06F 16/24578 |
| | | | 707/734 |
| 2016/0203237 A1 | 7/2016 | Whitnah et al. | |
| 2016/0224561 A1 | 8/2016 | Agarwal et al. | |

OTHER PUBLICATIONS

"U.S. Appl. No. 14/788,260, Final Office Action dated May 19, 2016", 9 pgs.

"U.S. Appl. No. 14/788,260, Non Final Office Action dated Feb. 23, 2017", 13 pgs.

"U.S. Appl. No. 14/788,260, Non-Final Office Action", 10 pgs.

"U.S. Appl. No. 14/788,260, Response filed Jan. 28, 2016 to Non-Final Office Action dated Oct. 28, 2015", 11 pgs.

"U.S. Appl. No. 14/788,260, Response filed Sep. 19, 2016 to Final Office Action dated May 19, 2016", 10 pgs.

"International Application Serial No. PCT/US2015/053307, International Preliminary Report on Patentability dated Aug. 10, 2017", 10 pgs.

"International Application Serial No. PCT/US2015/053307, International Search Report dated Dec. 28, 2015", 3 pgs.

"International Application Serial No. PCT/US2015/053307, Written Opinion dated Dec. 28, 2015", 8 pgs.

* cited by examiner

| CONTENT ITEM 410 | TYPE 504 | ASSOC. ENTITY 202 | PROFILE SCORE 508 | GRAPH SCORE 510 | AFFINITY SCORE 414 | AFFINITY ADJUST- MENT 414 | ADJUSTED AFFINITY SCORE 415 | CONTEXT SCORE 416 | LOI SCORE 418 | ADJUSTED LOI SCORE 419 |
|---|---|---|---|---|---|---|---|---|---|---|
| 410.1 | LINK | 202.2 | 20.0 | 42.5 | 62.5 | 1.75 | 109.375 | 0.18 | .1125 | .196875 |
| 410.2 | UPDATE | 202.3 | 31.5 | 28.0 | 58.5 | 0.5 | 29.25 | 0.25 | .14625 | .07312 |
| 410.3 | LINK | 202.4 | 40.1 | 21.7 | 61.8 | 0.75 | 46.35 | 0.18 | .11124 | .08343 |
| 410.4 | STATUS CHANGE | 202.5 | 18.8 | 5.0 | 23.8 | 1.00 | 23.8 | 0.15 | .357 | .357 |
| 410.5 | UPDATE | 202.2 | 20.0 | 42.5 | 62.5 | 1.75 | 109.375 | 0.25 | .15625 | .27343 |

FIG. 5

ADJUSTING HEAVY USERS' AFFINITY FOR HEAVY USER ENTITY-PAIRS IN A SOCIAL NETWORK

TECHNICAL FIELD

The subject matter disclosed herein generally relates to adjusting affinities between entities that are heavy users of a social network and entities associated with content items that are heavy users of the social network. The subject matter may include selecting content items to store or display determine from the adjusted affinity scores.

BACKGROUND

Social networks conventionally allow for a variety of types of entities to post content to the social network to be viewed by members of the social network. Entities including other members, companies, groups, sponsoring entities, and the like may provide content items to the social network. The social network may cause those items to be displayed on user interfaces of various members of the social network based on a variety of criteria. For instance, members who are connected to one another may see content items the other has posted to the social network, while a member who follows a company or group may see the content items posted by that company or group.

BRIEF DESCRIPTION OF THE DRAWINGS

Some embodiments are illustrated by way of example and not limitation in the figures of the accompanying drawings.

FIG. 5 illustrates a table that illustrates the determination of an adjusted affinity score in accordance with some embodiments;

DETAILED DESCRIPTION

Figure 1:
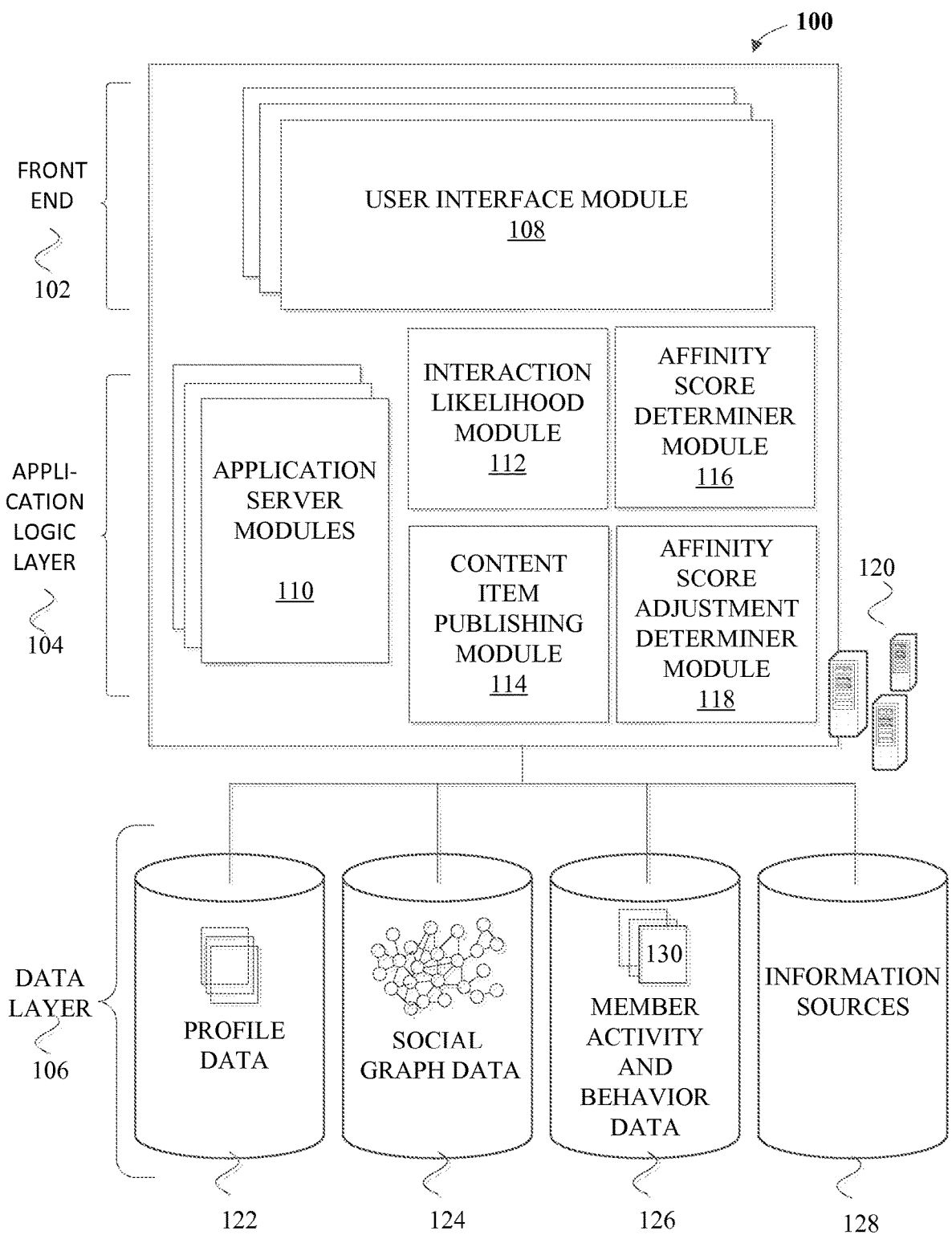
FIG. 1 is a block diagram of a social network system in accordance with some embodiments.

Example methods and systems are directed to the adjustment of an affinity score between an entity pair in a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Conventionally, content items for a social network may be displayed on a user interface of a user device associated with a member or user entirely or substantially entirely because the content items were received by the social network and automatically displayed to all of the members who are connected to the user that provided the content item. The order in which content items are displayed may be as basic as the sequence in which they were received. Thus, the user interface may simply be the display of some or all of the content items the member's connections posted to the social network in the order those content items were received.

Such a system may be insensitive to what the member would be most likely to find interesting and actually engage with by selecting a link, commenting, "liking", sharing with other members of the social network, and so on. Further, as the social network becomes large and the number of users of the social network and the connections between users increases, members may be inundated with unwieldy amounts of content items. Simply presenting content items to members in chronological order or another basic and conventional scheme may create a reduced user experience and less engagement with the social network.

However, anticipating what content items a member will likely want to see and will likely engage with may not be straightforward. It has been determined that members have a tendency to engage more frequently or more readily with content items posted by particular users than with content items posted by other users. Moreover, the social network may include many millions of members or even billions of members. Some of the members may be heavy users that interact frequently with the social network and may be important for the social network due to their heavy use.

A system has been developed that determines an affinity score between an affinity pair and adjusts the affinity score between an entity pair in a social network. The system may determine whether a first member of the entity pair is a heavy user member, and if the first member is the heavy user member, then the system may determine an affinity adjustment factor between the first member and the second member. The system may then adjust the affinity score between the first member and the second member of the entity pair in accordance with the adjustment factor to determine an adjusted affinity score.

The first member may be a user of the social network to whom a content item posted to the social network by the second member may be displayed. The entity pair is assigned a people affinity score that provides an adjustment to where on the user interface of a user device associated with the first member the content item is displayed. The adjusted affinity score may be used for heavy users of the social network.

As such, the social network system may be utilized to generate a likelihood score indicative of a likelihood that a content item will be interacted with by a first member if the content item is displayed on a user interface presented to the first member. The likelihood score may be separately calculated for multiple content items and utilized to rank the content items at least in part according to their relative likelihoods. The likelihood scores may be combined with other factors, such as values of the individual content items, or may be utilized without respect to other factors. The likelihood scores is based on an affinity the first member has for the content item type as well as an affinity the first member has for the second member who provided the content item to the social networking system. For heavy users of the social network an adjusted affinity score may be used.

In some embodiments the social network system improves resource efficiency by presenting content items that are more relevant to a user and not presenting content items that are less relevant to a user. The social network system may then present fewer content items to the user and, in some embodiments, reduces the number of content items that are considered for presenting to a user.

FIG. 1 is a block diagram of a social network system 100 in accordance with some embodiments. The social network system 100 is based on a three-tiered architecture, comprising a front-end layer 102, application logic layer 104, and data layer 106. Some embodiments implement the social network system 100 using different architectures. The social network system 100 is implemented on one or more computers 122. The computers 122 may be servers, personal computers, laptops, portable devices, etc. The social network system 100 may be implemented in a combination of software, hardware, and firmware.

As shown in FIG. 1, the front end 102 includes a user interface modules 108. In some embodiments, the user interface module 108 is a web service. The user interface module receives requests from various client-computing devices, and communicates appropriate responses to the requesting client devices. For example, the user interface module 108 receives requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer 106 includes profile data 122, social graph data 124, member activity and behaviour data 126, and information sources 128. Profile data 116, social graph data 118, member activity and behaviour data 120, and/or information sources 122 may be databases. The data layer 106 stores data relating to various entities represented in a social graph. In some embodiments, these entities include members, companies, and/or educational institutions, among possible others. Consistent with some embodiments, when a person initially registers to become a member of the social network system 100, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in profile data 122. With some embodiments, a member's profile data will include not only the explicitly provided data, but also any number of derived or computed member profile attributes and/or characteristic, which may become part of one of more of profile data 122, social graph data 124, member activity and behavior data 126, and/or information sources 128.

Activities by members of the social network system 100 are logged as activities 130 in the activity and behavior database 126. For example, the member activity and behavior data 126 includes activities 130 for a member that includes an interaction history with content items that includes the member associated with the content items and includes a determined likelihood of iteration 418 and whether the member interacted with the content item. Interactions include clicking on a link to read an article, commenting on a post to the social network, "liking" or otherwise approving of a post, sharing the post, or any of a variety of mechanisms by which a member may engage with social network content.

Once registered, a member may invite other members, or be invited by other members, to connect via the social network service. In some embodiments, a "connection" requires a bi-lateral agreement by the members, such that both members acknowledge the establishment of the connection. Similarly, with some embodiments, a member elects to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data 124. With some embodiments the social graph data 124 is implemented with a graph database, which is a particular type of database that uses graph structures with nodes, edges, and properties to represent and store data. In this case, the social graph data 124 reflects the various entities that are part of the social graph, as well as how those entities are related with one another.

With various alternative embodiments, any number of other entities might be included in the social graph data 124, and as such, various other databases are used to store data corresponding with other entities. For example, although not shown in FIG. 1, consistent with some embodiments, the system includes additional databases for storing information relating to a wide variety of entities, such as information concerning various online or offline people, jobs, companies, groups, posts, slide shares, and so forth.

With some embodiments, the social network service includes one or more activity and/or event tracking modules, which generally detect various user-related activities and/or events, and then store information relating to those activities/events in, for example, member activity and behavior data 126. For example, the tracking modules identifies when a user makes a change to some attribute of his or her member profile, or adds a new attribute. Additionally, a tracking module detects the interactions that a member has with different types of content. Such information is be used, for example, by one or more recommendation engines to tailor the content presented to a particular member, and generally to tailor the user experience for a particular member.

Information sources 128 is one or more additional information sources. For example, information sources 128 includes ranking and business rules, historical search data, and reference data, as well as people, etc.

The application logic layer 104 includes various application server modules 110, which, in conjunction with the user interface module 108, generates various user interfaces (e.g., web pages) with data retrieved from the data layer 106. In some embodiments, individual application server modules 110 are used to implement the functionality associated with various applications, services and features of the social network service. For instance, a messaging application, such as an email application, an instant messaging application, or some hybrid or variation of the two, is implemented with one or more application server modules 110. Of course, other applications or services may be separately embodied in their own application server modules 110. In some embodiments applications may be implemented with a combination of application service modules 110 and user interface modules 108. For example, interaction likelihood module 112, content item publishing module 114, affinity score determiner module 116, and/or affinity score adjustment module 118 may be implemented with a combination of back-end modules, front-end modules, and modules that reside on a user's computer (not illustrated). For example, the social network system 100 may download a module to a web browser running on a user's computer, which may communicate with a module running on a server 120 which may communicate with a module running on a back-end database server of the data layer 106.

The social network system 100 provides a broad range of applications and services that allow members the opportunity to share and receive information, often customized to the interests of the member. For example, with some embodiments, the social network system 100 includes a photo sharing application that allows members to upload and share photos with other members. As such, at least with some embodiments, a photograph is a property or entity included within a social graph. With some embodiments, members of a social network service are able to self-organize into groups, or interest groups, organized around a subject matter or topic of interest. Accordingly, the data for a group is stored in groups, which may be a database of information sources 128. When a member joins a group, his or her membership in the group is be reflected in the social graph data 124. In some embodiments, members subscribe to or join groups affiliated with one or more companies. For instance, with some embodiments, members of the social network service indicate an affiliation with a company at which they are employed, such that news and events pertaining to the company are automatically communicated to the members. With some embodiments, members are allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data 124.

In addition to the various application server modules 110, the application logic layer includes an interaction likelihood module 112, message publishing module 114, affinity score determiner module 116, and/or affinity score adjustment module 118. As illustrated in FIG. 1, with some embodiments the interaction likelihood module 112, content item publishing module 114, affinity score determiner module 116, and/or affinity score adjustment module 118 are implemented as a service that operates in conjunction with various application server modules 110 and user interface modules 108. For instance, any number of individual application server modules 110 can invoke the functionality of the interaction likelihood module 112, content item publishing module 114, affinity score determiner module 116, and/or affinity score adjustment module 118. However, with various alternative embodiments, the interaction likelihood module 112, content item publishing module 114, affinity score determiner module 116, and/or affinity score adjustment module 118 may be implemented as their own application server module 110 such that it operates as a stand-alone application.

The content item publishing module 106 is utilized to receive content such as electronic messages, posts, links, images, videos, and the like, and publish the content to the social network. For example, user interface 400 (FIG. 3) illustrates content items 306 being published for interaction with a member.

One or more of the content item publishing module 114, affinity score determiner module 116, and/or affinity score adjust module 118, or the social network system 100 generally may include an interaction likelihood module 112. The interaction likelihood module 108 determines a likelihood of interaction that a member of a social network system will interact with a given content item displayed on their user interface. For example, the interaction likelihood module 108 determines a likelihood of interaction 418 (FIG. 4) that member 1 402 of a social network system 100 will interact with content item 410 displayed on the user interface 300 (FIG. 3) of member 1 402.

The interaction likelihood module 108 determines the likelihood of interaction 418 based on an affinity score 414 and a context score 416. The affinity score 414 is an indication of an affinity between member 1 402 to whom the content item 410 may be published (e.g., displayed in the user interface 300 of member 1 402) and a member 2 406 that is associated with content item 410 (e.g., member 2 406 may have provided the content item 410 and/or be the subject of the content item 410). In some embodiments, the interaction likelihood module 112 utilizes data from the data layer 106 in the determination of interaction likelihood.

One or more of the interaction likelihood module 112, affinity score determiner module 116, affinity score adjust module 118, or the social network system 100 generally may include a content item publishing module 112. The content item publishing module 112 may publish a content item to one or more members. For example, the content item publishing module 112 generates the user interface 300 of member 1 402 based on selecting content items 410, 412 that member 1 402 is more likely to interact with.

One or more of the interaction likelihood module 112, content item publishing module 114, affinity score adjust module 118, or the social network system 100 generally may include an affinity score determiner module 116. The affinity score determiner module 116 determines an affinity score 414 (FIG. 4) for entity 1 402 and entity 2 406.

One or more of the interaction likelihood module 112, content item publishing module 114, affinity score adjust module 118, or the social network system 100 generally may include an affinity score adjustment determiner module 118. The affinity score adjustment module 118 adjusts an affinity score 414 (FIG. 4) based on an affinity between heavy user entity pairs.

The interaction likelihood module 112, content item publishing module 114, affinity score determiner module 116, and/or affinity score adjustment module 118 may be implemented on a separate server or may be part of a server that provides other portions of the social network system 100. Moreover, in some embodiments, some or all of the data in the data layer 106 is replicated and accessed by the interaction likelihood module 112, content item publishing module 114, affinity score determiner module 116, and/or affinity score adjust module 118.

As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosed embodiments with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the disclosed embodiments are by no means limited to such architecture.

Figure 2:
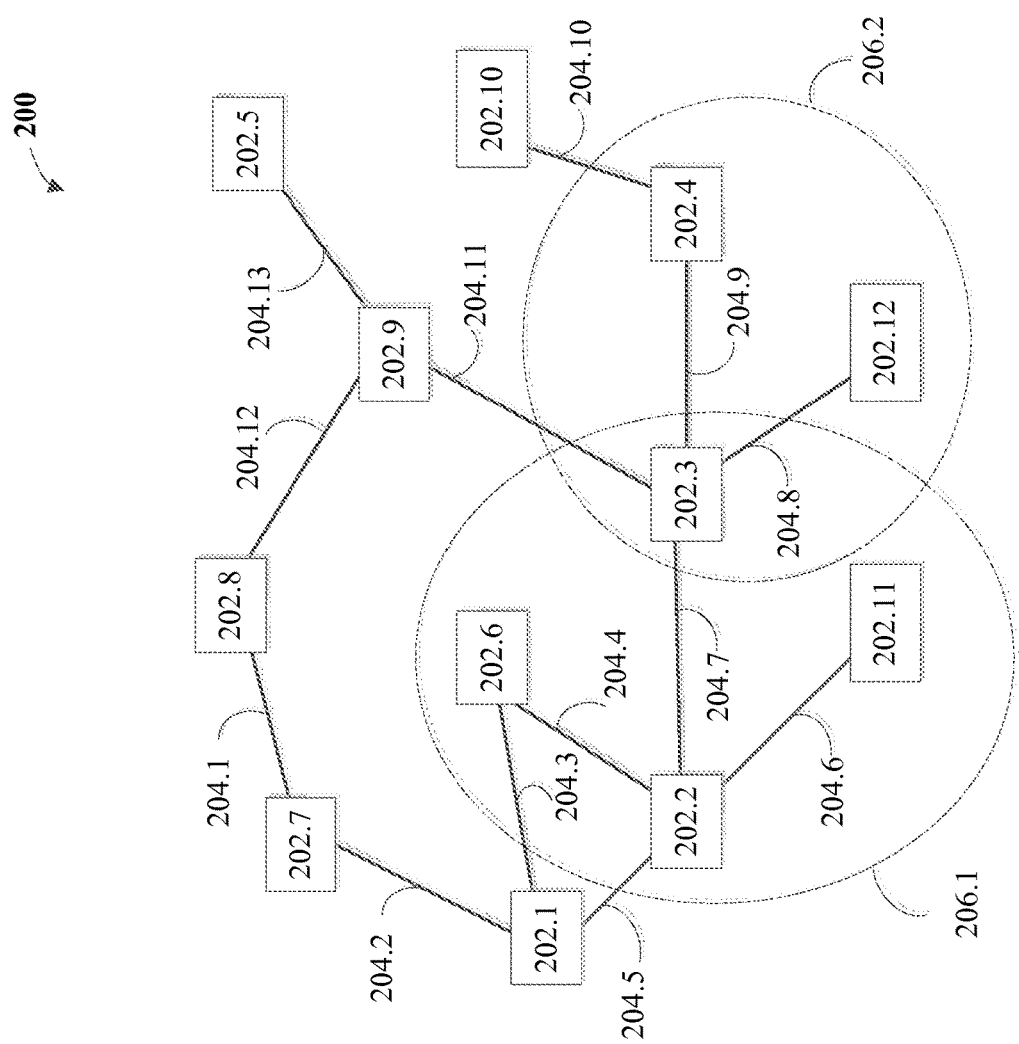
FIG. 2 is an illustration of a social network in accordance with some embodiments.

FIG. 2 is an illustration of a social network 200 in accordance with some embodiments. The social network 200 is provided by the social network system 100 or any suitable system. The social network 200 is included in the social graph data 124.

The social network 200 includes entities 202 linked to one another within the social network 200 via connections 204. For example, entity 202.1 is linked to entity 202.7 with connection 204.2. An entity 202 may be a member of the social network 200, a user of the social network 200, a company or organization that has access and may post content to the social network 200, a person, organization, or system that may interact with or influence the social network 200. Not all entities 202 have connections 204 with all of the other entities 202. For example, entity 202.1 does not have a connection 204 directly with entity 202.5.

Entities 202 have affiliations 206 with other entities 202. For example, entities 202.2, 202.3, 202.6, and 202.11 are affiliated 206.1. Entities 202.2, 202.3, 202.6, and 202.11 may be employees of the same company, which may be an entity 202. In the example, the profile data 122 of entities 202.2, 202.3, 202.6, and 202.11 indicates that they are employees of the same company. In some embodiments, the company is not an entity 202, but the entities 202.2, 202.3, 202.6, 202.11 may indicate a company. The company may be identified using information sources 128. In some embodiments, the social network 200 determines the affiliation 206.1 based on the profile data 122 of entities 202.2, 202.3, 202.6, and 202.11.

As another example, entities 202.3, 202.4, and 202.12, went to the same school, which may be an entity 202. The profile data 122 of entities 202.2, 202.4, and 202.12 may indicate that they went to the same school. In some embodiments, the school may not be an entity 202, but the entities 202.3, 202.4, and 202.12 may indicate a school. The school may be identified using information sources 128. The social network 200 may determine the affiliation 206.2 based on the profile data 122 of entities 202.3, 202.4, and 202.12.

Entities 202 of the social network 200 have defined connection relationships between one another. Entities 202.1, 202.2 who have a direct connection 204.5 have a first-degree connection. Entities 202.1, 202.3 that do not have a direct connection 204 with one another but do have a direct connection 204.5 and 204.7, respectively, to another entity 202.2 have a second-degree connection. Entities 202.1 and 202.4 that do not have a second-degree connection but who are connected via two other entities 202.2 and 202.3 have a third-degree connection, and so forth.

In some embodiments, it is to be understood that the social network 200 incorporates many entities 202 such as millions, billions, or trillions. Each of those entities 202 may have many affiliations 206 and/or connections 204 that may be chosen by each entity 202, such as groups that the entity 202 may elect to join, or may be inferred by the social network 200 from the profile data 122.

Figure 3:
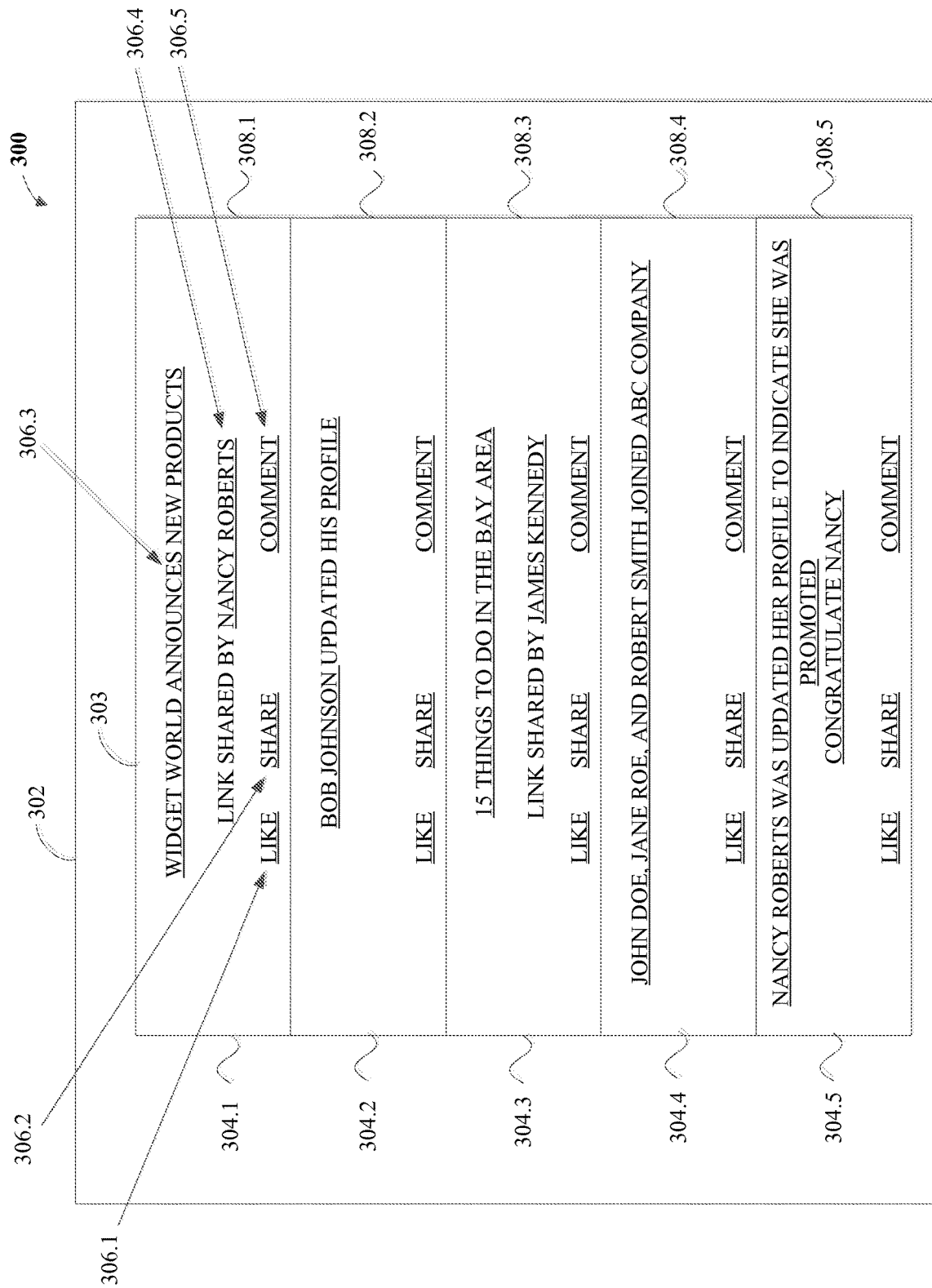
FIG. 3 is a depiction of a user interface generated by the social network system for display to an entity, in accordance with some embodiments.

FIG. 3 is a depiction of a user interface 300 generated by the social network system 100 for display to an entity 202, in accordance with some embodiments. The entity 202 is a member that is a user of the social network system 100 and is viewing the user interface 300 from a computer or mobile device. The user interface 300 includes a user screen 302 and a news feed 303 that includes the content item displays 304. The news feed 303 include positions 308, in this example, in a vertical list with a first position 308.1 at the top. In this example, the content item display 304 takes one position 308, but in other embodiments there may be multiple content items 304 in a single position or a content item display 304 may take more than one position. The content item displays 304 may correspond to a display of a content item 410 (FIG. 4).

In some embodiments, the content item 410 is displayed in the content item display 304. In some embodiments, the social network system 100 formats the content item 410 for the content item display 304. In some embodiments, the social network system 100 selects portions of the content item 410 for the content item display 304 such as a title. In some embodiments the social network system 100 adds interactive elements or non-interactive elements to the content item display 304. For example, as illustrated in FIG. 3, "Like" 306.1, "Share" 306.2, "Comment" 306.5, "Widget World Announces New Products" 306.3, and "Nancy Roberts" 306.4, are hotlinks for the member to interact with the display of the content item 304. For example, if the member selects "Widget World Announces New Products" 306.3, then the social network system 100 displays the full article "Widget World Announces New Products" on the user interface 302.

Figure 4:
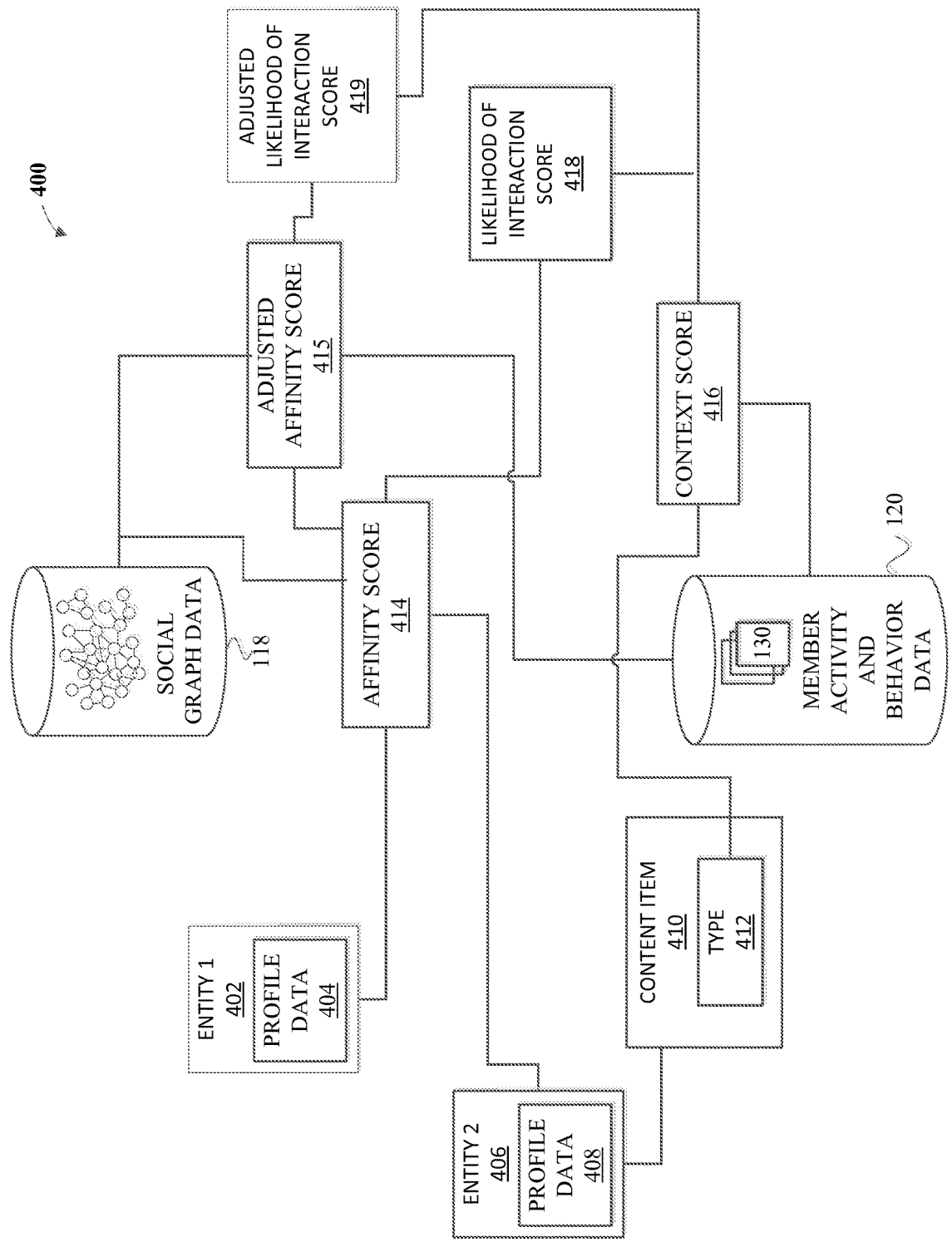
FIG. 4 illustrates a data flow diagram for determining an adjusted affinity score in accordance with some embodiments.

FIG. 4 illustrates a data flow diagram for determining an adjusted affinity score 414 in accordance with some embodiments. Illustrated in FIG. 4 is entity 1 402, entity 2 406, content item 410, affinity score 414, adjusted affinity score 415, context score 416, likelihood of interaction score 418, adjusted likelihood of interaction score 418, social graph data 118, and member activity and behavior data 120.

Entity 2 406 is an entity 202 that is associated with content item 410. For example, entity 2 406 is associated with the content item 410 by being the subject of the content item 410 such as "Bob Johnson" in content item display 304.2. In another example, entity 2 406 may be associated with the content item 410 by generating the content item 410 such as "15 Things To Do in The Bay Area" in content item display 304.3. The content item 410 that was used to generate content item display 304.3 may have been generated by entity 202 "James Kennedy." Entity 2 406 may be associated with the content item 410 in another way. Entity 2 406 may not be an entity 202 in the social network system 100. For example, entity 2 406 may be a sports team that is the subject of the content item 410. The social network system 100 may use data in information sources to determine information regarding entity 2 406.

Entity 1 402 may be an entity 202 that an affinity score 414, adjusted affinity score 415, context score 416, likelihood of interaction score 418 and/or adjusted likelihood of interaction score 419 is being determined for in relationship to entity 2 406 (to determine affinity score 414 and/or adjusted affinity score 415) and, optionally, in relation to content item 410 (context score 416). The affinity score 414, adjusted affinity score 415, and/or context score 416 is used to calculate the likelihood of interaction score 419 and/or the adjusted likelihood of interaction score 419. For example, entity 1 402 may be the entity 202.1 that the user interface 304 is being generated for by the social network system 100.

Entity 1 402 and entity 2 406 may include profile data 404, 408, respectively. The profile data 404, 408 may include data such as data described in conjunction with profile data 122.

Content item 410 may be a content item 410 as described in conjunction with FIG. 3. Content item 410 may be some content that the social network system 100 may determine to display to an entity 202 and/or use to modify data in the data layer 106. The content item 410 may be generated by social network system 100 such as the content item publishing module 114. In some embodiments the content item 410 may be generated by an entity 202 of the social network system 100. In some embodiments, data may be received from outside the social network system 100 and then turned into a content item 410 by, for example, the content item publishing module 114. The content item 410 may have a type 412, which may indicate a type of the content item 410.

Social graph data 118 may be social graph data 118 as described herein. Member activity and behavior data 120 may be member activity and behavior data 120 as described herein.

The likelihood of interaction score 418 may be determined by the interaction likelihood module 108. The likelihood of interaction 418 may indicate a likelihood that a content item 410 will be interacted with by an entity 202 if the content item 410 is displayed on a user interface 300 presented to the entity 202. A likelihood of interaction score 418 may be separately calculated for multiple content items 410 and utilized to rank the content items 410 at least in part according to their relative likelihood of interaction scores 418. The likelihood of interaction scores 418 may be combined with other factors, or may be utilized without other factors. The content item publishing module 114 may use the likelihood of interaction score 418 to determine whether to present content item 410 to entity 1 402 such as in a content item display 304 of the user interface 300.

The interaction likelihood module 108 may apply two factors in determining the likelihood score: an affinity score 414 and/or adjusted affinity score 415 and a context score 416. The likelihood of interaction score 418 may utilize additional factors.

The affinity score 414 is a score that is based on an affinity between entity 1 402 and entity 2 406. The affinity score determiner module 116 may determine the affinity score 414. To determine the affinity score 414, the affinity score determiner module 116 may utilize one or both of profile data 404, 408 of entity 1 402 and entity 2 406, respectively, and social graph data 118 in relation to entity 1 402 and entity 2 406. The context score 416 is based, at least in part, on member activity and behavior data 120 performed by entity 1 402 in relation to the content item 410 and content item type 412 of the subject content item 306. Thus, the context score 416 is based, at least in part, on interactions by entity 1 402 with content items of the same type as type 412 of content item 410.

The adjusted affinity score 415 may be determined by the affinity score adjustment determiner module 118. The adjusted affinity score 415 may be the affinity score 414 adjusted for entities 202 that are heavy users of the social network system 100. The adjustment may be based on an affinity of entity 1 402 for entity 2 406 in relation to an affinity of entity 1 402 for other entities 202.

The interaction likelihood module 108 may be configured to determine the adjusted likelihood of interaction score 419 based on the adjusted affinity score 415.

In some embodiments, the affinity score 414 is agnostic concerning the type 412 of the content item 410 and focuses instead on indicators of overall quality of a relationship or potential relationship between entity 1 402 and entity 2 406. While the affinity score 414 is based on an overall quality of a connection 204 between the users entity 1 402 and entity 2 406 and a similarity of the profile data 404, 408 of entity 1 402 and entity 2 406, respectively, it is to be recognized that any of a variety of factors that may help to determine a relationship or likely relationship between entity 1 402 and entity 2 406 may be used. The social graph data 118 may be used by the affinity score determiner module 116 to determine the affinity score 414 based on a social graph density related to the entity 1 402 and entity 2 406.

The profile data 404, 408 may be used by the affinity score determiner module 116 to determine the affinity score may 414 based on common or related profile data 404, 408 between the entity 1 402 and entity 2 408. The profile data 404, 408 may include particular data points as disclosed herein, such as, but not limited to, career, education, age, gender, location, interests, and so forth. To the extent that those data points are the same or similar between the users entity 1 402 and entity 2 406 the profile score portion of the affinity score 414 may be increased.

The context score 416 may be based on the content item 410 that is the subject of the likelihood of interaction score 418 in relation to the entity 1 402 corresponding to the user interface 300 on which the content item 410 is being considered for display. The type context score 416 is based on a type 412 of the content item 410 in relation to member activity and behavior data 120 by the entity 1 402 in relation to other content items of the same type as type 412. In particular, the context score 416 may be based on a propensity for the entity 1 402 to interact or engage with content items of that same type as type 412 and/or the interactions with content items of the same type as type 412. In some embodiments, the interaction likelihood module 112 may determine types that are similar to the type 412 in determining the context score 416. In some examples, the context score 416 may additionally or alternatively be based on a mathematical model that may compensate for additional factors related to the past interactions with the content item of the same type as type 412. The adjusted affinity score 415 may be an adjustment of the affinity score 414 for heavy users and described herein.

FIG. 5 illustrates a table 500 that illustrates the determination of an adjusted affinity score 516 in accordance with some embodiments. Table 500 illustrates an affinity score 512, an adjusted affinity score 516, likelihood of interaction (LOI) score 518, and adjusted LOI score 419 for multiple content items 410 that are being considered for display on an interface of an entity 202 in accordance with some embodiments. For example, continuing the examples above, the content items 410 may be considered for being displayed on user interface 300 (FIG. 3) as content item displays 304 for entity 1 402. Entity 1 402 may be entity 202.1 (FIG. 2).

The content items 410 may be considered for entity 1 402, which may be an entity 202 that a profile score 508, graph score 510, affinity score 512, affinity adjustment 514, adjusted affinity score 516, context score 518, LOI score 520, and adjusted LOI score 419 is being determined for in relationship to the associated entity 506.

Each content item 410 includes a type 504 and an associated entity 202. As disclosed herein, the associated entity 202 may be associated with the content item 410. For example, the associated entity 202 may be an originator of the content item 306 or may be a subject of the content item 410. For each content item 410 an affinity score 414 is determined between entity 1 402 and the associated entity 202. The affinity score 414 is determined by based on a profile score 508 and a graph score 510. For example, in some embodiments the affinity score 414 is the sum of the profile score 508 and the graph score 510. The profile scores 508 and graph scores 510 may be determined according to the methods disclosed herein. For content items 410 that have the same associated entity 202, the profile score 408, graph score 510, and resultant affinity score 414 is the same as the affinity score 414 is based on the associated entity 202. Therefore, the affinity score 406 would only need to be computed once for each associated entity 202 for different content items 410.

The context score 412 is determined based on the type 504 for each content item 410 according to the methods disclosed herein. As disclosed herein, the context score 416 is based on the member activity and behavior data 120 of entity 1 402 and the type 412 of the corresponding content item 410. Thus, to the extent that more than one content item 410 has the same content item type 504 the context scores 416 of those content items 410 would be the same.

The LOI score 418 for each of the content items 410 may be determined by multiplying the affinity score 414 by the context score 416. In an example, the content items 410 may be ranked according to their respective LOI scores 418. In some embodiments, the content items 410 may then be displayed on the user interface 300 in positions 308 corresponding to their LOI score 418, with the highest ranked content item 410 in the first position 308.1, the second highest ranked content item 410 in the second position 308.2, and so forth until the positions 308 are filled. The social network system 100 may incorporate the LOI score 418 for each content item 410 with other factors related to the content item 410. For example, a sponsored content bid, determined non-monetary values, and content diversity requirements may be incorporated to select the final positions 308 (and whether to display the content item 410) for the content items 410. Such subject matter such as the determination of the LOI score 418 is disclosed, for instance, in U.S. application Ser. No. 14/788,260, "CONTENT PROVISION BASED ON USER-PAIR AFFINITY IN A SOCIAL NETWORK", which is incorporated by reference herein in its entirety. Moreover, a determination of an affinity score is disclosed, for instance, in U.S. application Ser. No. 14/788,260, filed Jun. 30, 2015, entitled "CONTENT PROVISION BASED ON ENTITY-PAIR AFFINITY IN A SOCIAL NETWORK," which is incorporated herein by reference in its entirety.

In some embodiments the social network system 100 may determine whether entity 1 402 is a heavy user of the social network system 100. If the entity 1 402 is a heavy user of the social network system 100, then the social network system 100 may determine an adjusted affinity score 415 between entity 1 402 and the associated entity 202. The social network system 100 may determine an affinity adjustment 414 and use the affinity adjustment 414 to determine the adjudged affinity score 415. The social network system 100 may determine an adjusted LOI score 419 based on the adjusted affinity score 415. In some embodiments, the social network system 100 may use the adjusted LOI score 419 to determine whether or not to display the corresponding content item 410 to entity 1 402.

The affinity score determiner module 116 may determine the affinity score 414. The interaction likelihood module 112 may determine the LOI score 418 and/or the adjusted LOI score 419. The content item publishing module 114 may generate a user interface 300 based on the table 500. The affinity score adjustment determiner module 118 may determine the affinity adjustment 414 and adjusted affinity score 415.

Figure 6:
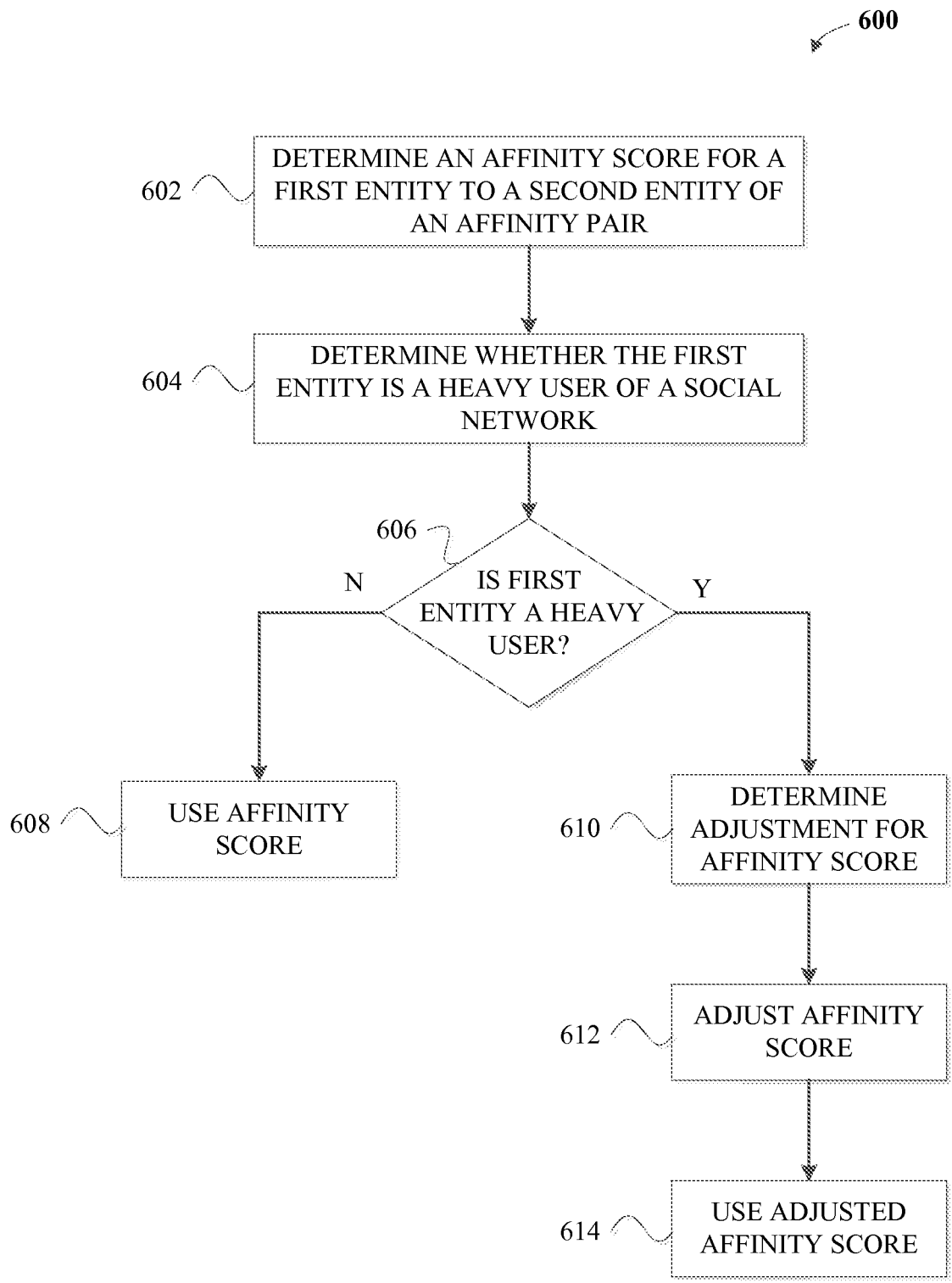
FIG. 6 illustrates a method of adjusting an affinity score between an entity pair in a social network in accordance with some embodiments.

The affinity adjustment 414, adjusted affinity score 415, adjusted LOI score 419 are disclosed further in conjunction with FIG. 6, which is discussed in conjunction with FIG. 5.

FIG. 6 illustrates a method 600 of adjusting an affinity score between an entity pair in a social network in accordance with some embodiments. The method 600 begin at operation 602 with determining an affinity score for a first entity to a second entity of an affinity pair. For example, the affinity score 414 is determined for entity 1 402 and associated entities 202. The method 600 continues at operation 604 with determining whether the first entity is a heavy user of a social network. The social network system 100 determines that an entity 1 402 is a heavy user based on member activity and behavior data 120. For example, the social network system 100 may use activities 130 to determine how often entity 1 402 interacts with content items 410. In some embodiments the social network system 100 may use a threshold value based on a date range to determine if entity 1 402 is a heavy user. For example, in some embodiments, the social network system 100 determines that entity 1 402 is a heavy user if entity 1 402 has interacted with five hundred or more content items 410 over the past year. In some embodiments, the social network system 100 determines whether entity 1 402 is a heavy user if entity 1 402 is in a top percentile of users that interact with content items 410 for a determined period of time. For example, entity 1 402 is determined to be a heavy user if entity 1 402 is in the top 5 percent of users that interact with content items 410 over the past month. In some embodiments, the social network system 100 determines if entity 1 402 is a heavy user based on the activities 130 between entity 1 402 and entity 2 406 in relation to interactions with content items 410. In some embodiments, the social network system 100 may determine if entity 1 402 is a heavy user based on how the adjustment for the affinity score is to be determined. For example, in some embodiments, the social network system 100 determines that an entity 1 402 is a heavy if the entity 1 402 has generated enough interaction data for the method to determine the adjustment for the affinity score. For example, some methods require a minimum amount of interaction data for the method to reliably determine an adjustment for the affinity score.

The method 600 continues at operation 606 with is first entity a heavy user. If the social network system 100 determines that entity 1 402 is not a heavy user, then the method 600 continues at operation 608 with using the affinity score. For example, in relation to the example of FIG. 5, if entity 1 402 is not a heavy user then the social network system 100 would use the LOI score 418 and not the adjusted LOI score 419.

If the social network system 100 determines that the entity 1 402 is a heavy user, then the method 600 continues at operation 610 with determining adjustment for affinity score. For example, in relation to the example of FIG. 5, the social network system 100 determines that entity 1 402 is a heavy user based on activities 130 that indicate that entity 1 402 interacted with content items 410 five hundred or more times in the last year.

The affinity score adjustment determiner module 118 determines an adjustment for affinity score as follows. $C_{ij}$ is the number of interactions (e.g., clicks) that entity i has performed for content items 410 associated with entity j. For example, entity i may have clicked on $C_{ij}$ content items 410 that were links shared by entity j or that were the subject of entity j. In some embodiments, the number of interactions is stored in the activities 130 of the member activity and behavior data 120. $S_{ijm}$ is the feature-based score of the mth impression that entity i has viewed where the mth impression is associated with entity j. For example, $S_{ijm}$ may be the LOI score 418 for an mth content item display 304 of content item 410. For example, referring to FIG. 5, for content item 410.1 the determined LOI score is 0.1125. An impression is the presentation of a display content item 304 on a user interface to entity 1 402.

In some embodiments, $S_{ijm}$ includes adjustments for presentation biases. For example, adjustments to the value of $S_{ijm}$ may be made for the position of the mth impression, and the platform the mth impression is presented on (e.g., phone vs. desktop). $S_{ijm}$ may include adjustments for features not keyed by the entity.

TABLE 1

Example of $C_{ij}$, where i is Entity 1 402 and j is Entity 202.2

| IMPRESSION | INTERACTION ($C_{ij}$) | LOI SCORE ($S_{ijm}$) |
|---|---|---|
| Impression 1 | No | 0.1 |
| Impression 2 | Yes | 0.4 |
| Impression 3 | No | 0.2 |
| Impression 4 | No | 0.1 |
| Impression 5 | Yes | 0.1 |

$C_{ij}$ is the total number of interactions (e.g., clicks) that entity i (e.g., entity 1 402) produces on impressions from associated entity j (e.g., entity 202.2). In accordance with table 1, $C_{ij}=1+1=2$.

$S_{ij}$ is determined using $$S_{ij} = \sum_m S_{ijm}.$$

In accordance with table 1, $S_{ij}=0.1+0.4+0.2+0.1+0.1=0.9$. Referring to FIG. 5, i is entity 1 402, and j is entity 202.2 where table 1 refers to previous interaction of entity 1 402 with display content items 304 on a user interface 300 associated with entity 202.2.

$C_i$ is the total number of interactions (e.g., clicks) that entity i (e.g., entity 1 402) produces on impressions from any associated entity. For purposes of this example assume $C_i=10$, which may be smaller than a number that may be needed for entity i to be considered a heavy user entity in accordance with operation 604 (FIG. 6).

$S_i$ is determined by $$S_i = \sum_j S_{ij},$$

which may be the total number of impression that entity i has viewed for all other entities. For example, referring to FIG. 5, $S_i$ is all the impressions that entity 1 402 has viewed including those from entities 202 that are part of FIG. 5.

Continuing with the example, $S_i$ is 12.58. Alpha is determined by $\alpha_k = C_i/S_i$. Continuing with the example of table 1, $\alpha_k = 10/12.58 = 0.79$.

In some embodiments $C_{ij}$ is approximated to be a Poisson distribution $C_{ij} \sim$ Poisson ($s_{ij}*\alpha_i*\alpha_{ij}$). In some embodiments alpha ($\alpha$) is determined by $\alpha \sim$ Gamma (mean=1, size $\gamma$), where $\gamma$ is a tuning parameter. In some embodiments the posterior distribution of $\alpha_{ij}$ is given by:

$$\alpha_{ij} = \text{Gamma}\left(\text{mean} = \hat{\alpha}_{ij} = \frac{\gamma + c_{ij}}{\gamma + \alpha_i s_{ij}}, \text{var} = \frac{\gamma + c_{ij}}{(\gamma + \alpha_i s_{ij})^2}\right).$$

In some embodiments the score of an impression may vary. For example, in some embodiments, the score of an item associated with entity j for the viewer of the impression entity i is given by: i=FeatureBasedScore*$\hat{\alpha}_{ij}^w$, where w is a tuning parameter.

Continuing with the example of table 1, if $\gamma=1$, then $\alpha_{ij}=(\gamma+C_{ij})/(\gamma+\alpha_i*s_{ij})=(1+2)/(1+0.79*0.9)=3/1.71=1.75$. So, the affinity adjustment 414 for entity 1 402 and associated entity 202.2 in FIG. 5 is 1.75. In the example of FIG. 5 and table 1, entity 1 402 is more likely to interact with a content item 410 associated with the entity 202.2 so the adjusted LOI score 419 is increased by a factor of 1.75.

The method 600 continues at operation 610 with adjusting affinity score 612. For example, in FIG. 5 the LOI score 418 is adjusted by 1.75 for associated entity 202.2 to increase the likelihood that entity 1 402 will interact with a display content item 304 where the content item 410 is associated with entity 202.2.

The method 600 continues at operation 614 with using adjusted affinity score. For example, the adjusted affinity score 415 is used to determine an adjusted LOI score 419 which may be used to determine which content items 410 to present on the user interface 300. The method 600 may end.

Figure 7:
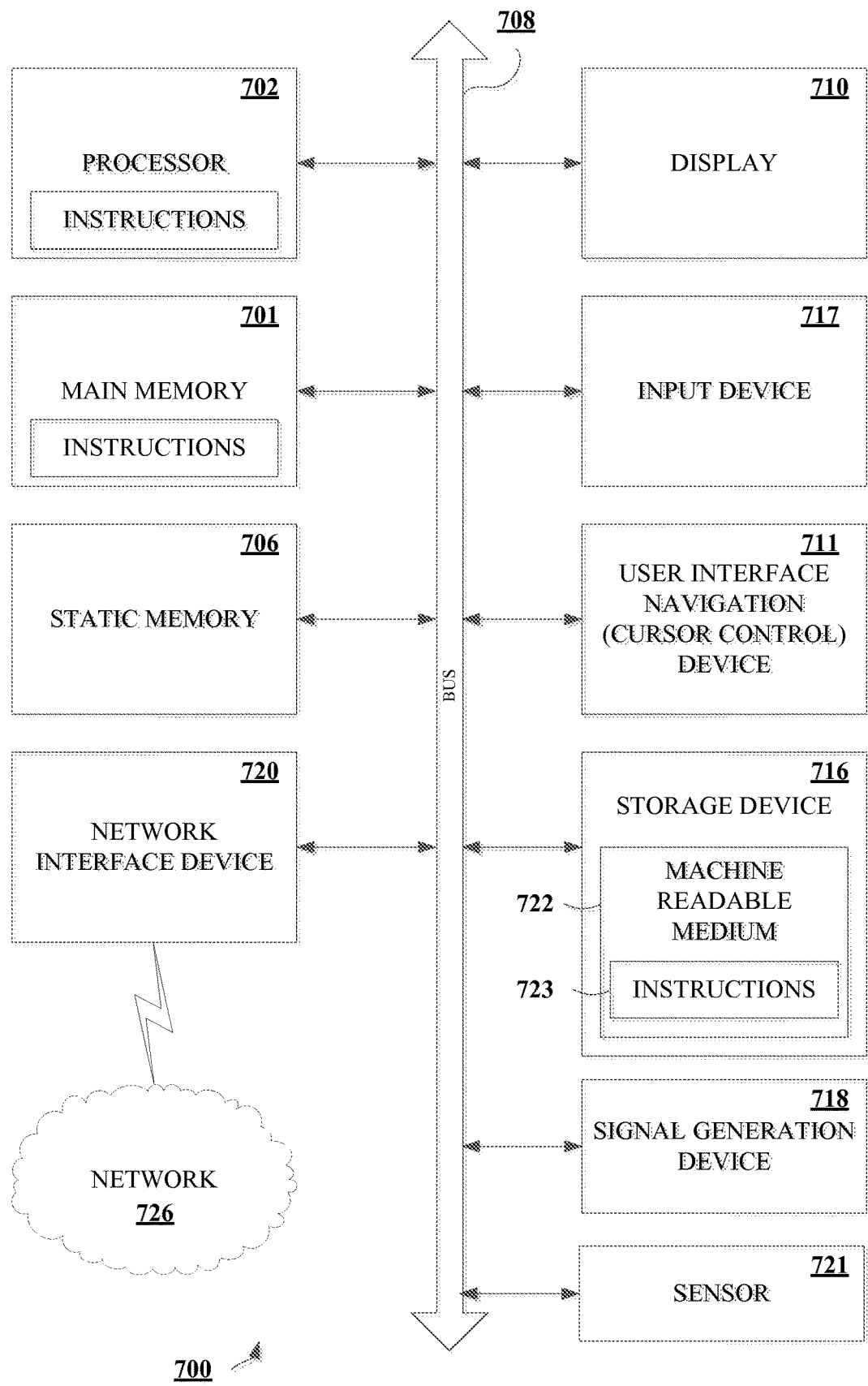
FIG. 7 shows a diagrammatic representation of the machine in the example form of a computer system and within which instructions (e.g., software) for causing the machine to perform any one or more of the methodologies discussed herein may be executed.

FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following examples pertain to further embodiments. Example 1 is an method of adjusting an affinity score between an entity pair in a social network. The method includes determining, with a hardware processor, whether a first member of the entity pair is a heavy user member, and in response to a determination that the first member of the entity pair is the heavy user member, determining, with the processor, an affinity adjustment factor between the first member and the second member. The method may include adjusting, with the processor, the affinity score between the first member and the second member of the entity pair in accordance with the adjustment factor to determine an adjusted affinity score.

In Example 2, the subject matter of Example 1 can optionally include where determining whether the first member of the entity pair is the heavy user member further includes determining, with the processor, whether a number of interactions on content items indicates that the first member is the heavy user member.

In Example 3, the subject matter of Examples 1 and 2 can optionally include where determining whether the first member of the entity pair is the heavy user member further includes determining, with the processor, a percentile of a number of interactions of the first member relative to all members of the social network, and determining whether the first member is the heavy user member from the percentile of the number of interactions.

In Example 4, the subject matter of any of Examples 1-3 can optionally include where determining, with a processor, the affinity adjustment factor between the first member and the second member is determined from a number of interactions the first member performed with content items associated with the second member divided by a first expected number of interactions the first member would perform with content items associated with the second member multiplied with a second number of interactions the first member performed with content items associated with all members divided by a second expected number of second interactions the first member would perform with the content items associated with all members.

In Example 5, the subject matter of any of Examples 1-4 can optionally include where the first expected number of interactions the first member would perform with content items associated with the second member is determined by summing up a probability of interaction for each interaction associated with the second member.

In Example 6, the subject matter of any of Examples 1-5 can optionally include where adjusting the affinity score between the first member and the second member of the entity pair in accordance with the adjustment factor, further includes multiplying, with the processor, the affinity score by the adjustment factor to determine an adjusted affinity score.

In Example 7, the subject matter of any of Examples 1-6 can optionally include generating, with the processor, the affinity score representing a measure of affinity between the first member and the second member from related profile data between the first member and the second member and social graph data related to the first member and the second member.

In Example 8, the subject matter of any of Examples 1-7 can optionally include where the measure of affinity represents a likelihood that the first member will interact with content items where the second member either generated the content items or is a subject of the content items.

In Example 8, the subject matter of Example 7 can optionally include where the social network includes a plurality of members including the first member and the second member, wherein the plurality of members are connected to other ones of the plurality of members via connections in the social network, and wherein generating the social graph density score is generated using values of connections within the social graph related to the first member and the second member.

In Example 10, the subject matter of any of Examples 1-9 can optionally include where the adjusting, with the processor, the affinity score further includes multiplying, with a processor, the affinity score between the first member and the second member of the entity pair with the adjustment factor.

In Example 11, the subject matter of any of Examples 1-10 can optionally include determining a likelihood of interaction from the adjusted affinity score for a plurality of content items, selecting one or more of a plurality of content items with a higher likelihood of interaction than other of the plurality of content items, generating a user interface comprising a representation of the one or more of the plurality of content items, and causing, via a network interface, the user interface to be displayed to the first member.

In Example 12, the subject matter of any of Examples 1-11 can optionally include where retrieving a plurality of content items from a data storage device, determining a likelihood of interaction from the adjusted affinity score for the plurality of content items, selecting one or more of a plurality of content items with a higher likelihood of interaction than other of the plurality of content items, discarding from the plurality of content items content items not selected, associating nondiscarded content items of the plurality of content items with the first user, and storing the nondiscarded content items of the plurality of content items in the data storage device.

In Example 13, the subject matter of any of Examples 1-12 can optionally include where the second member is associated with a content item that is being considered for display to the first member.

Example 14 is a system, the system including an electronic data storage is configured to store an affinity score between an entity pair in a social network, a network interface, and a processor, configured to: determine whether a first member of the entity pair in the social network is a heavy user member, and if the first member is the heavy user member, determine the affinity adjustment factor between the first member and the second member, and adjust the affinity score between the first member and the second member of the entity pair in accordance with the adjustment factor to determine an adjusted affinity score.

In Example 15, the subject matter of Example 14 can optionally include where the processor is configured to determine whether the first member of the entity pair is the heavy user member if a number of interactions on content items is above a threshold that indicates that the first member is the heavy user member, and where the electronic data storage is configured to store the content items and the number of interactions.

In Example 16, the subject matter of Examples 14 and 15 can optionally include where the processor is configured to determine a percentile of a number of interactions with content items of the first member relative to all members of the social network, and determine whether the first member is the heavy user member from the percentile of the number of interactions with content items.

In Example 17, the subject matter of any of Examples 14-16 can optionally include where the processor is configured to determine the affinity adjustment factor between the first member and the second member from a number of interactions the first member performed with content items associated with the second member divided by a first expected number of interactions the first member would perform with content items associated with the second member compared with a second number of interactions the first member performed with content items associated with all members divided by a second expected number of second interactions the first member would perform with the content items associated with all members, where the first expected number of interactions the first member would perform with content items associated with the second member is determined with the affinity score.

In Example 18, the subject matter of any of Examples 14-17 can optionally include where the processor is configured to generate the affinity score from related profile data between the first member and the second member and social graph data related to the first member and the second member.

In Example 19, the subject matter of any of Examples 14-18 can optionally include where the processor is configured to: determine a likelihood of interaction from the adjusted affinity score for a plurality of content items, select one or more of the plurality of content items using the likelihood of interaction, generate a user interface comprising a representation of the selected one or more of the plurality of content items, and cause, via the network interface, the user interface to be displayed to the first member.

Example 20 is a method of adjusting an affinity score between an entity pair in a social network. The method includes determining, with a hardware processor, whether a first member of the entity pair is a heavy user member, and in response to a determination that the first member of the entity pair is the heavy user member, determining, with the processor, an affinity adjustment factor between the first member and the second member. The method further includes adjusting, with the processor, the affinity score between the first member and the second member of the entity pair in accordance with the adjustment factor to determine an adjusted affinity score, and determining a likelihood of interaction from the adjusted affinity score for a plurality of content items. The method further includes selecting one or more of a plurality of content items with a higher likelihood of interaction than other of the plurality of content items, and generating a user interface comprising a representation of the one or more of the plurality of content items. The method may further include causing, via a network interface, the user interface to be displayed to the first member.

What is claimed is:

1. A method comprising:
   calculating a first affinity score for a first pair of members of an online network, the first pair of members including a first member and a second member of the online network, the first affinity score indicating an estimated affinity level between the first member and the second member;
   calculating a second affinity score for a second pair of members of the online network, the second pair of members including the first member and a third member of the online network, the second affinity score indicating an estimated affinity level between the first member and the third member;

determining, based on activity data of the second member, a first number of content items that the second member has interacted with during a predetermined period of time;

determining, based on activity data of the third member, a second number of content items that the third member has interacted with during the predetermined period of time;

determining that the first number meets or exceeds a threshold number;

determining that the second number does not meet or exceed the threshold number;

in response to determining that the first number meets or exceeds the threshold number, increasing the first affinity score based on an affinity adjustment factor determined for the first pair or members, yielding a first adjusted affinity score, wherein the second affinity score is not adjusted as a result of the second number not meeting or exceeding the threshold number; and ranking a set of content items posted to the online service for presentation to the first user, yielding a ranking, wherein the set of content items includes at least a first content item posted to the online network by the second member and a second content item posted to the online network by the third member, the first content item being ranked based on the first adjusted affinity score and the second content item is ranked based on the second affinity score;

determining, based on the ranking, an order in which to present the set of content items to the first user, yielding a determined order of the set of content items, wherein the first content item and the second content item are not included in either the content items that the second member has interacted with during the predetermined period of time nor the content items that the third member has interacted with during the predetermined period of time;

causing presentation of the first content item and the second content item to the first user based on the determined order of the set of content items, the first content item and the second content item presented to the first user within a user interface displayed on a display of a client device associated with the first user.

2. The method of claim 1, wherein determining that the first number meets or exceeds the threshold number indicates that the first member is a heavy user member.

3. The method of claim 1, herein determining that the first number meets or exceeds the threshold number comprises:
  determining, based on the first number, a percentile of interactions of the second member relative to other members of the online network; and
  determining the percentile of interactions meets or exceeds the threshold number.

4. The method of claim 1, further comprising:
  determining the affinity adjustment factor based on a number of interactions the first member performed with content items associated with the second member divided by a first expected number of interactions the first member would perform with content items associated with the second member multiplied with a second number of interactions the first member performed with content items associated with all members divided by a second expected number of second interactions the first member would perform with the content items associated with all members.

5. The method of claim 4, wherein the first expected number of interactions the first member would perform with content items associated with the second member is determined by summing up a probability of interaction for each interaction associated with the second member.

6. The method of claim 1, wherein increasing the first affinity score comprises:
  multiplying the first affinity score by the affinity adjustment factor to determine the adjusted affinity score.

7. The method of claim 1, wherein the estimated affinity level between the first member and the second member represents a likelihood that the first member will interact with content items where the second member either generated the content items or is a subject of the content items.

8. The method of claim 1, wherein the online network includes a plurality of members including the first member and the second member, and the plurality of members are connected to other ones of the plurality of members via connections in the online network.

9. The method of claim 1, wherein increasing the first affinity score comprises:
  multiplying the first affinity score with the affinity adjustment factor.

10. The method of claim 1, wherein ranking the set of content items comprises:
  determining, based on the first adjusted affinity score and the second affinity score, a first likelihood value indicating a likelihood of the first user interacting with the first content item posted by the second user, and a second likelihood value indicating a likelihood of the first user interacting with the second content item posted by the third user;
  ranking the first content item and the second based on the first likelihood value and the second likelihood value.

11. A system comprising:
  one or more computer processors; and
  one or more computer-readable mediums storing instructions that, when executed by the one or more computer processors, cause the system to perform operations comprising:
    calculating a first affinity score for a first pair of members of an online network, the first pair of members including a first member and a second member of the online network, the first affinity score indicating an estimated affinity level between the first member and the second member;
    calculating a second affinity score for a second pair of members of the online network, the second pair of members including the first member and a third member of the online network, the second affinity score indicating an estimated affinity level between the first member and the third member;
    determining, based on activity data of the second member a first number of content items that the second member has interacted with during a predetermined period of time;
    determining, based on activity data of the third member, a second number of content items that the third member has interacted with during the predetermined period of time;
    determining that the first number meets or exceeds a threshold number;
    determining that the second number does not meet or exceed the threshold number;
    in response to determining that the first number meets or exceeds the threshold number, increasing the first affinity score based on an affinity adjustment factor determined for the first pair or members, yielding a first adjusted affinity score, wherein the second affinity score is not adjusted as a result of the second number not meeting or exceeding the threshold number; and ranking a set of content items posted to the online service for presentation to the first user, yielding a ranking, wherein the set of content items includes at least a first content item posted to the online network by the second member and a second content item posted to the online network by the third member, the first content item being ranked based on the first adjusted affinity score and the second content item is ranked based on the second affinity score;

determining, based on the ranking an order in which to present the set of content items to the first user, yielding a determined order of the set of content items, wherein the first content item and the second content item are not included in either the content items that the second member has interacted with during the predetermined period of time nor the content items that the third member has interacted with during the predetermined period of time;

causing presentation of the first content item and the second content item to the first user based on the determined order of the set of content items, the first content item and the second content item presented to the first user within a user interface displayed on a display of a client device associated with the first user.

12. The system of claim 11, wherein determining that the first number meets or exceeds the threshold number indicates that the first member is a heavy user member.

13. The system of claim 11, wherein determining that the first number meets or exceeds the threshold number comprises:

determining, based on the first number a percentile of interactions of the second member relative to other members of the online network; and determining the percentile of interactions meets or exceeds the threshold number.

14. The system of claim 11, the operations further comprising:

determining the affinity adjustment factor based on a number of interactions the first member performed with content items associated with the second member divided by a first expected number of interactions the first member would perform with content items associated with the second member multiplied with a second number of interactions the first member performed with content items associated with all members divided by a second expected number of second interactions the first member would perform with the content items associated with all members.

15. The system of claim 14, wherein the first expected number of interactions the first member would perform with content items associated with the second member is determined by summing up a probability of interaction for each interaction associated with the second member.

16. The system of claim 11, wherein increasing the first affinity score comprises:

multiplying the first affinity score by the affinity adjustment factor to determine the adjusted affinity score.

17. The system of claim 11, wherein the estimated affinity level between the first member and the second member represents a likelihood that the first member will interact with content items where the second member either generated the content items or is a subject of the content items.

18. The system of claim 11, wherein the online network includes a plurality of members including the first member and the second member, and the plurality of members are connected to other ones of the plurality of members via connections in the online network.

19. The system of claim 11, wherein increasing the first affinity score comprises:

multiplying the first affinity with the affinity adjustment factor.

20. A non-transitory computer-readable medium storing instructions that, when executed by one or more computer processors of a computing server, cause the computing server to perform operations comprising:

calculating a first affinity score for a first pair of members of an online network, the first pair of members including a first member and a second member of the online network, the first affinity score indicating an estimated affinity level between the first member and the second member;

calculating a second affinity score for a second pair of members of the online network, the second pair of members including the first member and a third member of the online network, the second affinity score indicating an estimated affinity level between the first member and the third member;

determining, based on activity data of the second member a first number of content items that the second member has interacted with during a predetermined period of time;

determining, based on activity data of the third member, a second number of content items that the third member has interacted with during the predetermined period of time;

determining that the first number meets or exceeds a threshold number;

determining that the second number does not meet or exceed the threshold number;

in response to determining that the first number meets or exceeds the threshold number, increasing the first affinity score based on an affinity adjustment factor determined for the first pair or members, yielding a first adjusted affinity score, wherein the second affinity score is not adjusted as a result of the second number not meeting or exceeding the threshold number; and ranking a set of content items posted to the online service for presentation to the first user, yielding a ranking, wherein the set of content items includes at least a first content item posted to the online network by the second member and a second content item posted to the online network by the third member, the first content item being ranked based on the first adjusted affinity score and the second content item is ranked based on the second affinity score;

determining, based on the ranking, an order in which to present the set of content items to the first user, yielding a determined order of the set of content items, wherein the first content item and the second content item are not included in either the content items that the second member has interacted with during the predetermined period of time nor the content items that the third member has interacted with during the predetermined period of time;

causing presentation of the first content item and the second content item to the first user based on the determined order of the set of content items, the first content item and the second content item presented to the first user within a user interface displayed on a display of a client device associated with the first user.

* * * * *

UNITED STATES PATENT AND TRADEMARK OFFICE
CERTIFICATE OF CORRECTION

| | |
|---|---|
| PATENT NO. | : 10,673,965 B2 |
| APPLICATION NO. | : 14/839531 |
| DATED | : June 2, 2020 |
| INVENTOR(S) | : Obukhov et al. |

Page 1 of 1

It is certified that error appears in the above-identified patent and that said Letters Patent is hereby corrected as shown below:

On the Title Page

On page 2, in Column 2, item (56) under "Other Publications", Line 5, delete "Action"," and insert --Action dated Oct. 28, 2015",-- therefor In the Claims In Column 21, Line 47, in Claim 3, delete "herein" and insert --wherein-- therefor Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*